WATER SOLUBILITY OF VARIOUS FORMS OF CALCIUM SULFATE

United States Patent Office 3,822,340
Patented July 2, 1974

3,822,340
CALCIUM SULFATE WHISKER FIBERS AND THE METHOD FOR THE MANUFACTURE THEREOF
James Joseph Eberl, Moylan, Edmund Thelen, Wayne, and Harold L. Heller, Narberth, Pa., assignors to Franklin Key, Inc., Valley Forge, Pa.
Filed Mar. 27, 1972, Ser. No. 238,048
Int. Cl. C01f 11/46
U.S. Cl. 423—555
5 Claims

ABSTRACT OF THE DISCLOSURE

Calcium sulfate whisker fibers are provided as well as a method for the manufacture thereof. The calcium sulfate fibers of this invention have excellent tensile strengths and are fire-proof. The calcium sulfate whisker fibers are especially useful as high strength reinforcements for shaped articles, as a fire-proofing and insulation material in construction of buildings in place of asbestos, and as additives for paper and the like.

BACKGROUND OF THE INVENTION

(1) Field of the Invention

This invention is concerned with a novel class of whisker fibers and the method for the preparation thereof.

(2) Description of the Prior Art

Whisker fibers as a class of materials are well known to those skilled in the art. Whisker fibers can be defined as being an extremely fine single crystal filament of a metal or an inorganic compound. A wide variety of materials have heretofore been suggested for use as whisker fibers. These materials have included, for example, sapphire, boron nitride, elemental boron, potassium titanate and so forth. Heretofore, the most common methods to produce whisker fibers has been to reduce a metal halide in hydrogen at about 700° C. to initiate crystal growth or to react a molten metal vapor with an oxidizing, nitriding or another atmosphere conducive to crystal growth.

Because of the high cost of certain of the starting materials used in the preparation of whisker fibers and also because of the relatively costly methods of production heretofore employed, the most of whisker fibers has heretofore been prohibitively high. The high cost of whisker fibers has limited the use of this class of material to highly specialized applications, such as, high speed aircraft application and the like, wherein it is essential to have the high strength and low weight obtained using whisker fiber reinforcement.

If the cost of whisker fibers were substantially reduced, whisker fibers could advantageously be used in a wide variety of other applications. For example, whisker fibers could be used in structural units, such as, beams, sheathing, flooring and the like to provide strong, light weight building materials. In addition, low cost whisker fibers could be used as reinforcement in molded plastic articles to obtain light weight, high strength products.

There currently is a very pressing need for a non-toxic, inexpensive, fire-proof fibrous material to replace asbestos for insulating and fire-proofing buildings. Asbestos has been directly connected with certain medical conditions. Asbestos, for example, has been found to cause lung cancer in humans, as well as causing perforation of the bowels. The inhalation or ingestion of the relatively short fibers and dust which are inherently present in asbestos are particularly troublesome. These short fibers imbed themselves in the lining of the respiratory and digestive tracts and are not dissolved by normal body processes since asbestos is chemically inert in normal body fluids. As a result, the imbedded asbestos fibers remain as a permanent irritant in the body.

The use of asbestos is expected to be significantly decreased because of the above noted potential dangers. As reported in the New York Times, Sunday, July 18, 1971 the New York City Council has banned the spraying of insulation composition containing asbestos fibers in the city of New York because of the inherent health problems associated with asbestos. It is expected that other major cities will follow the example of New York City in the near future, by banning spraying of asbestos fibers. The problem to date is that a suitable fibrous substitute for asbestos has not been found, especially when price is taken into consideration.

Calcium sulfate and certain of its hydrated forms are well known to those skilled in the art and have been extensively investigated. Anhydrous calcium sulfate in its natural form is known by various names such as anhydrous sulfate of lime. This material is normally found in the form of orthorhombic crystals. Insoluble anhydrous calcium sulfate which is also known as dead burnt calcium sulfate is produced by complete dehydration of calcium sulfate dihydrate at 650° C. or higher. The manufactured anhydrous calcium sulfate, like the naturally occurring anhydrous calcium sulfate, is comprised of orthorhombic crystals. A soluble form of calcium anhydrite is obtained in a granular or powder form by dehydrating calcium sulfate dihydrate at 300° C. in an electric oven. Soluble calcium sulfate anhydrite will readily absorb about 6.6% of water to form a stable calcium sulfate hemihydrate product.

Calcium sulfate dihydrate, which is commonly known as gypsum, normally exists in the form of lumps or powder. It is widely used in the manufacture of construction materials such as wallboard, rock lath and the like.

$\beta$-Calcium sulfate hemihydrate is a fine white powdery material which is widely used to form calcium sulfate dihydrate.

Because of the relative commercial importance of calcium sulfate and its hydrated derivatives, considerable research has been conducted on methods of preparing these compounds. Booge et al., U.S. Pat. 2,006,342 disclosed making insoluble calcium sulfate anhydrite by seeding an aqueous solution of hydrated or soluble anhydrite calcium sulfate at an elevated temperature with insoluble calcium sulfate to produce non-acicular insoluble calcium anhydrite sulfate. Roberts, U.S. Pat. 2,151,-331 further disclosed an additional method to produce insoluble anhydrous calcium sulfate in the form of a fine powder by converting soluble calcium anhydrite to the insoluble form by treating it with sulfuric acid at an elevated temperature.

Most of the work in this field has been directed to producing insoluble calcium sulfate anhydrite in a finely divided powdery form suitable for use as a pigment or filler. However, not all of the work with calcium sulfate has been concentrated in this area. For example, Eberl and Ingram in "Process for Making High Strength Plaster of Paris" (Industrial and Engineering Chemistry, Vol. 41, pg. 1061, May 1949) reported their efforts to improve the properties of plaster of Paris. A number of articles and various efforts of others to improve the properties of plaster of Paris were reported, as well as the results of the experiments conducted by Eberl and Ingram. It was reported, for example, that additives used in the preparation of plaster of Paris have a definite effect on the shape of the crystals produced as a result of the dehydration of the dihydrate to hemihydrate. It was stated, for example, that when gypsum was autoclaved at 115° C. in water, that an extremely fluffy form of plaster of Paris was produced which was comprised of somewhat elongated acicular particles. Eberl and Ingram reported, however, that when these particles were blended with water and hydrated the resulting product did not set into a coherent mass, and they found these fibers were not stable in water. As a result of further experimentation, Eberl and Ingram reached the conclusion that the preferred form of plaster of Paris consisted of orthorhombic crystals since this product, when hydrated and allowed to set, produced a strong coherent product.

SUMMARY OF THE INVENTION

In accordance with this invention calcium sulfate whisker fibers and more particularly calcium sulfate hemihydrate and calcium sulfate anhydrite whisker fibers, which can be stabilized against transformation from the whisker fibers form are provided.

It is an object of this invention to provide whisker fibers having high strength and relatively low cost.

It is an additional object of this invention to provide an inorganic fibrous material which can be used as a high strength reinforcement for shaped articles.

It is a still further object of this invention to provide a non-toxic inorganic, fire-proof, fibrous material.

It is a still further object of this invention to provide high strength calcium sulfate whisker fibers.

It is an additional object of this invention to provide an inorganic fibrous material which can be used as a major component in plaster, liquids such as paint, caulking compounds, soil stabilizers, cosmetics and the like.

Other objects and advantages of this invention will become further apparent hereinafter and from a continued reading of the specification and sub-joined claims.

DESCRIPTION OF THE PREFERRED EMBODIMENT

The Product

The calcium sulfate whisker fibers of this invention are characterized by being single elongated crystals having a mean diameter to average length ratio (d./l.) of at least 1:6 and preferably considerably higher, for example, 1:60 to 1:100.

The calcium sulfate whisker fibers can be comprised of calcium sulfate hemihydrate, soluble calcium sulfate anhydrite, and most preferably, insoluble calcium sulfate anhydrite. The calcium sulfate hemihydrate and soluble calcium sulfate anhydrite whisker fibers are stabilized to prevent transformation from the whisker fiber form. For certain applications where the whisker fibers will be exposed to a considerable amount of moisture, as an added precaution even the insoluble calcium sulfate anhydrite fibers are treated to further insure that the fibers will not lose their whisker form. Various methods of stabilization will be discussed in greater detail below.

Figure 1:
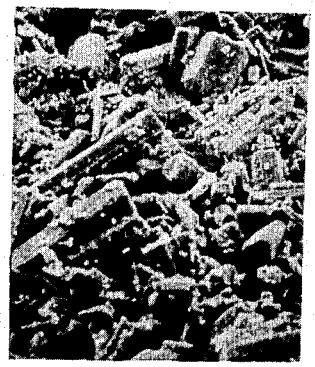
FIG. 1 is a scanning electron micrograph (1,000×) of α-calcium sulfate hemihydrate.

In order to facilitate an explanation of this invention, reference will be made to the drawing. FIG. 1 is a scanning electron micrograph of α-calcium sulfate hemihydrate. It can be seen that the particles are formed in generally rhombic crystals. The particles have a relatively low diameter to length ratio and in general are quite irregular in configuration.

Figure 2:
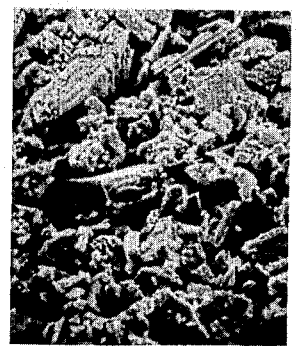
FIG. 2 is a scanning electron micrograph (1,000×) of β-calcium sulfate hemihydrate.

FIG. 2 is a scanning electron micrograph of calcium sulfate hemihydrate. This material is the more common form of plaster of Paris. It can be seen from the photomicrograph that the form has a considerably less definite crystalline configuration being almost spongy in character.

Both the α and β form of calcium sulfate hemihydrate shown in FIGS. 1 and 2 are well known materials and are clearly distinct from the novel whisker fibers form of calcium sulfate described hereinafter.

Figure 3:
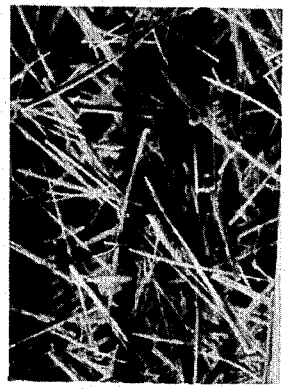
FIG. 3 is a scanning electron micrograph (1,000×) of the calcium sulfate anhydrite whisker fibers of this invention.

FIG. 3 is a scanning electron micrograph of insoluble calcium sulfate anhydrite whisker fibers of this invention magnified 1,000 times. As can be seen from FIG. 3 the calcium sulfate anhydrite whisker fibers have a distinctly different configuration from the materials shown in FIGS. 1 and 2. The particles are elongated fibers which are relatively uniform in width and length. The fibers have a length which is many times their width. The fibers exist in the form of individual fiber crystals rather than as bundles or clumps. The fibers are white in color and have a somewhat lustrous appearance. The material can be formed into a fluffy mass which when felt between the fingers has a very definite silky feel which is somewhat surprising considering the mineral fiber characteristics of the material. The calcium sulfate anhydrite whisker fibers are fire-proof and are physiologically inert like the conventionally well known forms of calcium sulfate. The material illustrated was heat treated at 200° C. and is characterized by exhibiting dead burnt characteristics normally found in the orthorhombic form of insoluble calcium sulfate anhydrite.

Figure 4:
FIG. 4 is a scanning electron micrograph (1,000×) of stabilized calcium sulfate hemihydrate whisker fibers of this invention.

FIG. 4 is a scanning electron micrograph of stabilized calcium sulfate hemihydrate whisker fibers. These whisker fibers have been treated so as to prevent hydration and the resulting destruction of the whisker fibers properties. Fibers made of soluble calcium sulfate anhydrite would appear similar to the fibers shown in FIG. 4. The soluble calcium sulfate anhydrite whisker fibers would likewise be stabilized to prevent hydration and transformation from the whisker fiber form.

The whisker fibers which are used in space age material, such as sapphire ($Al_2O_3$), boron, boron nitride, carbon, etc., if they are true whisker fibers, usually have a tensile strength in excess of 500,000 p.s.i. and in the purer crystalline fiber materials the tensile strength is in the range of from 1,000,000 p.s.i. and even higher. Most whisker fibers have tensile strengths in excess of 10 times the strength of the commercially available synthetic organic polymeric fibers.

In order to determine beyond a doubt that the products of this invention are true whisker fibers and even more important that the products exhibit the high strength characteristics of whisker fibers, the tensile strength, elongation at the break and the modulus were evaluated by using insoluble calcium sulfate anhydrite whisker fibers as reinforcement in a polyester resin test block. The mechanical properties of cast articles prepared without the use of whisker fibers and with whisker fiber reinforcements were compared and found to be as follows:

| Fiber content (vol. percent) | Tensile strength (p.s.i.) | Elongation at break, percent | Modulus, p.s.i. |
|---|---|---|---|
| 0 | 2,370 | 0.73 | 324,000 |
| 8.2 | 4,370 | 0.67 | 652,000 |

The remarkable increase in both tensile strength and modulus with the slight decrease in elongation clearly demonstrates that the products of this invention are true whisker fibers.

Figure 5:
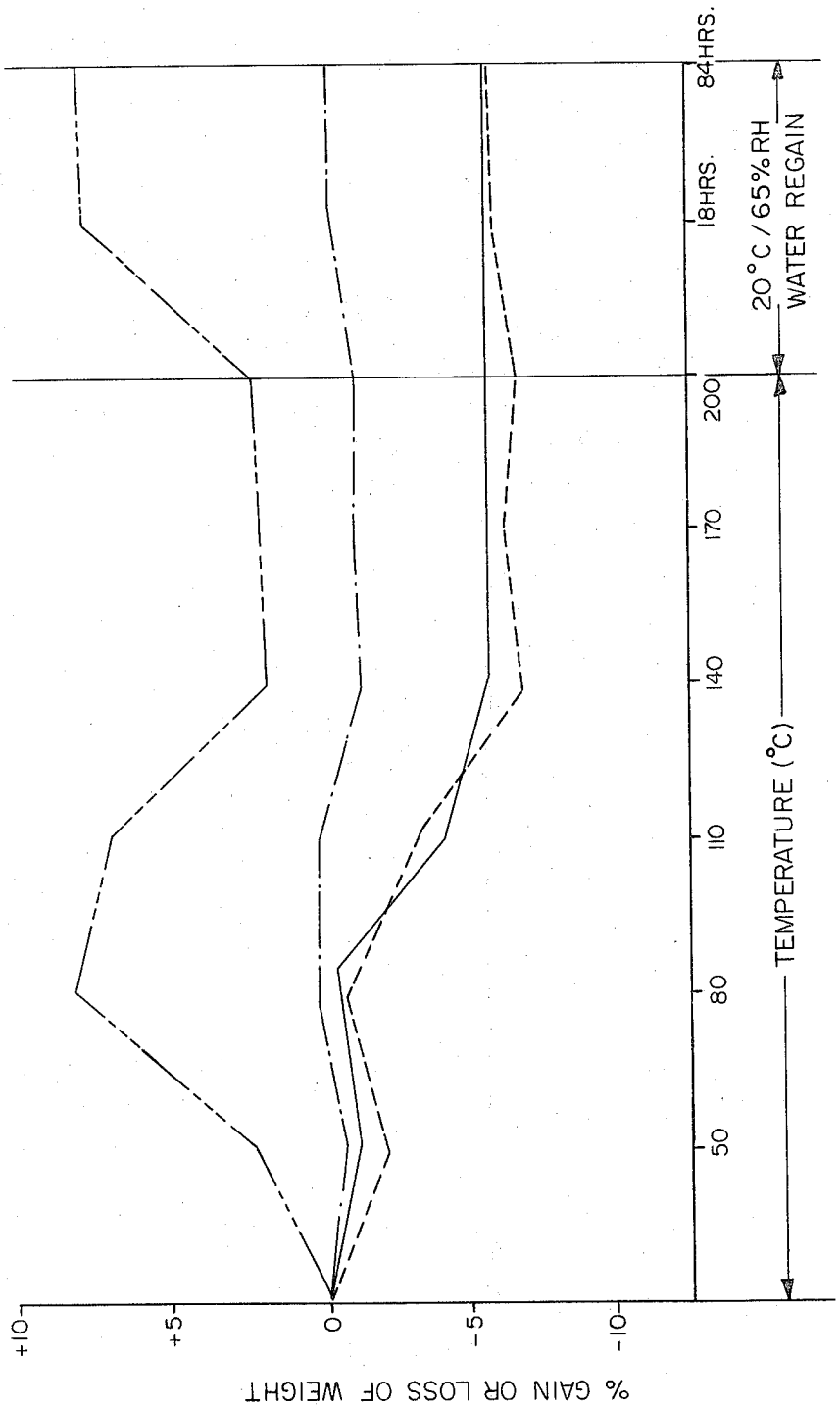
FIG. 5 is a graphic illustration of the effects of heat on the gain or loss of water of various forms of calcium sulfate.

In order to further establish that the calcium sulfate whisker fibers have a different physical-chemical structure, more precisely molecular orientation, than the calcium sulfate materials heretofore known, the effect of temperature on weight loss and gain and regain were carefully evaluated as well as the water solubility. As shown in FIG. 5 the characteristics of the whisker fibers of this invention are quite different from most of the known forms of calcium sulfate. This test was conducted in a 50% RH atmosphere. The 0 point on the graph of FIG. 5 was the starting point of the test. As expected, soluble calcium sulfate anhydrite of the conventional orthorhombic configuration rapidly hydrated to the dihydrate form. Then on continued heating dehydrated the hemihydrate form and on regain again hydrated to the dihydrate form.

β-Calcium sulfate hemihydrate was relatively stable over both the heating period and the regain period.

The α-calcium sulfate hemihydrate, shown in FIG. 1, dehydrates to the anhydrite form and upon being heated to about 140°–200° exhibit a substantial dead burnt characteristic and did not regain the lost water of hydration.

The calcium sulfate whisker fibers of this invention are shown on the graph as a solid line. At the start of the test (0 point) the fiber was a calcium sulfate hemihydrate whisker fiber. At about 80–110° the fiber lost the water and was converted in what is believed to be the soluble calcium sulfate anhydrite whisker fibers. At about 140–200° C., the fiber was converted into an insoluble dead burnt calcium sulfate anhydride whisker fiber, which is the most preferred class of whisker fibers. It can be seen that this whisker fiber in the regain test did not regain any moisture and is truly dead burnt.

Figure 6:
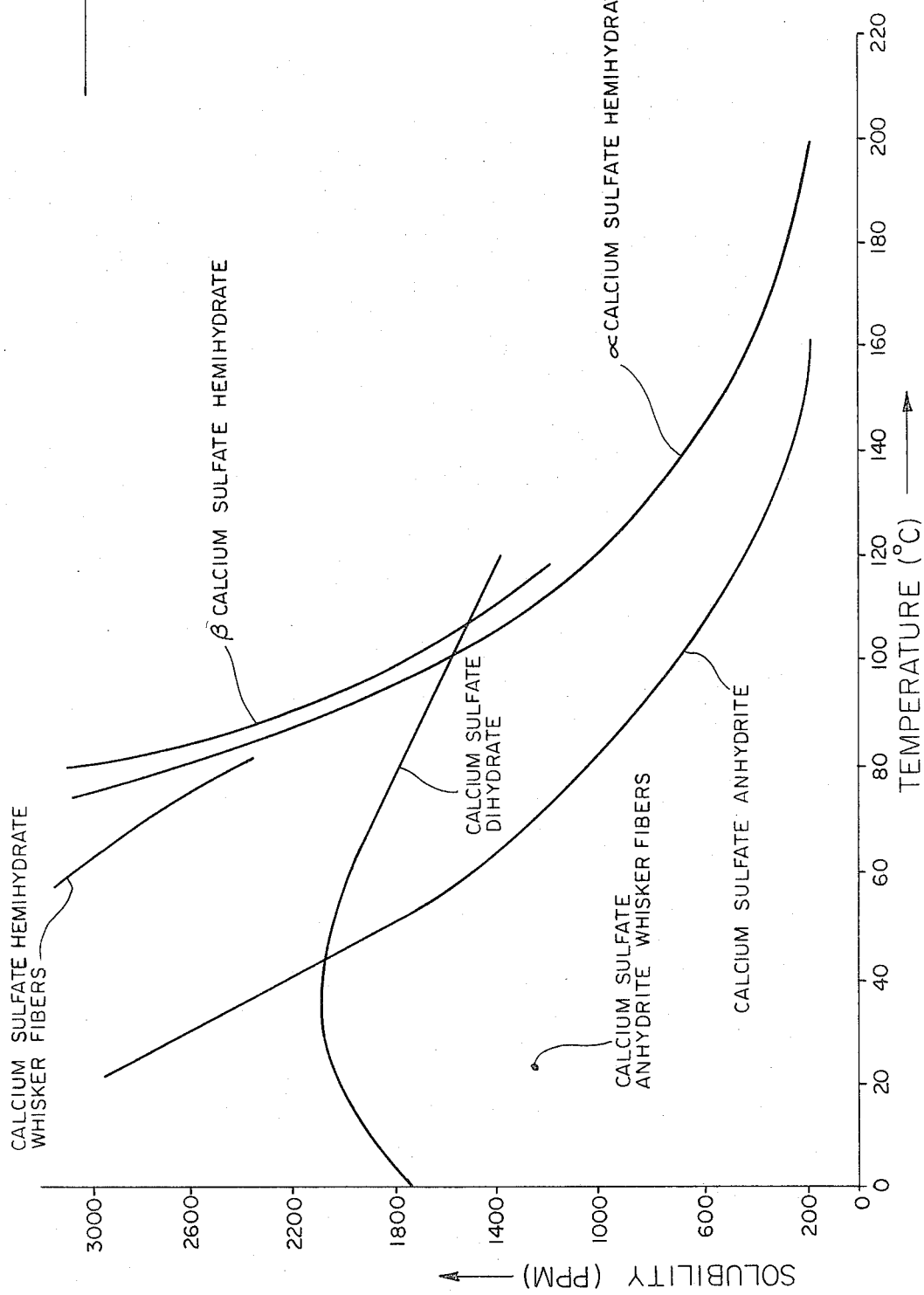
FIG. 6 is a graphic illustration of the water solubility of various types of calcium sulfate.

The solubility in water of various forms of calcium sulfate are shown in FIG. 6. It can readily be seen that even the solubilities in water of the various forms of calcium sulfate are likewise distinctly different.

The above tests of physical and chemical properties and the shape establish beyond a doubt that new forms of calcium sulfate have been provided.

As was pointed out above the product cost of the prior art whisker fibers in general are at least several hundred to thousands of dollars a pound which eliminates them for consideration for use in most products. The calcium sulfate whisker fibers of this invention on the other hand, when prepared in accordance with the process of this invention, can be manufactured for a small fraction of the cost, making the calcium sulfate whisker fibers competitive with many of the relatively inexpensive materials heretofore used as reinforcements. In addition, since the whisker fibers of this invention have such excellent physical properties, even lesser amounts can be used further reducing the cost.

Manufacture of the Whisker Fibers

The general method of preparation is comprised of the steps of preparing an aqueous mixture of calcium sulfate dihydrate. The purity of the calcium sulfate dihydrate is not particularly critical. In fact, it appears that technical grades of calcium sulfate dihydrate produce somewhat longer fibers than the higher purity grades of calcium dihydrate.

The relative ratio of the calcium sulfate dihydrate and water in the mixture is not critical. However, it has been found that using a mixture of 20 grams per liter of calcium sulfate dihydrate is preferred as it is easier to handle in the process equipment. In addition, with more dilute reaction mixtures the final product will have good fiber lengths which is desired in certain applications. If the concentration is increased considerably in excess of 100 grams per liter the fibers tend to be shorter and also clump together which is likewise preferable for certain applications.

The reaction temperature can be varied from for example 110° C.–150° C. or even higher. The temperatures and pressures are interrelated with each other since to obtain the higher temperature and maintain a liquid reaction medium the pressure will also increase. The time of reaction is dependent on the temperature and pressure employed. The time of reaction is the time required for formation of the fibers. Once the fibers form the heating can be continued if desired, but it does not improve the properties of the fibers. Excellent fibers are obtained at 125° C. in three to five minutes.

It should be appreciated, however, that the reaction pressures, times and temperatures referred to above are a typical combination which produce satisfactory calcium sulfate whisker fibers. The reaction condition can be varied considerably and still obtain a satisfactory product.

The pressure equipment used for manufacture of the whisker fibers of this invention should preferably have a sight glass so as to be able to observe the formation of the fibers. Once whisker fiber formation is completed the heating can be terminated.

The whisker fibers can be produced in a batchwise manner. It is also possible to continuously produce the whisker fibers using, for example, a continuous screw reactor feeding the mixture of water and calcium sulfate dihydrate at the entrance thereof, reacting the mixture during passage through the reactor and separating the whisker fibers from the water at the exit end of the conveyor.

It should be carefully noted that as pointed out that the calcium sulfate whisker fibers of this invention are provided in three chemical forms, namely, calcium sulfate hemihydrate, insoluble calcium sulfate anhydrite and soluble calcium sulfate anhydrite.

The calcium sulfate hemihydrate fibers are obtained by recovering the fibers before they are allowed to cool, and treating them so as to stabilize the whisker fibers against rehydration to the non-fibrous dihydrate form.

The soluble calcium sulfate anhydride is obtained as above except the calcium sulfate hemihydrate fibers are dried at an elevated temperature to remove any surface water and the water of hydration. The temperature is limited to less than about 140° C. to produce the soluble rather than the insoluble calcium sulfate whisker fibers. This soluble calcium sulfate anhydrite can also be produced by seeding the starting mixture with about 20% by weight of ground insoluble calcium sulfate whisker fibers based on the weight of the calcium sulfate dihydrate and then recovering the soluble anhydrite and drying the resulting product as described above. The soluble calcium sulfate anhydrite whisker fibers are then preferably stabilized against transformation from the whisker fiber form.

The preferred product, insoluble calcium sulfate anhydrite whisker fiber, is produced by initially producing the hemihydrate fiber as described above and then heating it at a temperature in excess of about 140° C. and preferably 200° C. or higher, until a dead burnt fiber is obtained. While generally not required, it is preferable to also stabilize the anhydrite fibers.

Stabilization of the Whisker Fibers

Stabilization of the calcium sulfate hemihydrate and soluble anhydrite whisker fibers is required in order to prevent transformation from the fibrous form which results in a deterioration of the physical properties.

Almost any means can be used to stabilize the fibers which prevents rehydration and does not attack the whisker fibers. Certain relatively inert water proofing materials such as paraffin wax can be used. These materials, however, depend on physical adhesion and accordingly there is a tendency for the material to strip from the whisker fibers and also to cause the individual fibers to stick together in bunches.

Calcium sulfate has reactive sites on the whisker fibers and will react with certain reactants to produce monomolecular, highly adherent coatings on the fibers. The fibers exhibit a strongly cationic and anionic adhesion capability probably due to the sulfate and calcium ions. The fibers can be reacted with hydrolyzed proteins which form a protective coating on the whisker fibers. Typical results obtained using protein hydrolysates are as follows:

Weight percent of protein
hydrolizates based on
weight of hemihydrate
whisker fiber:
 0.00% _____ 6 minutes.
 0.005% _____ 2 hours.
 0.05% _____ 48 hours.
 0.50% _____ 2 months plus.

The anhydrite forms of the whisker fibers are more stable and in particular the dead burnt anhydrite type. Without stabilizers the dead burnt anhydrite shows no change in one week when in contact with water. In the presence of 0.05% protein hydrolyzates no change was observed even after one month.

An additional class of stabilizers which are particularly effective in preventing the rehydration of the anhydrite and particularly the hemihydrate to the dihydrate are anionic polycarboxylic acid polymers such as polyethylene maleic acid
polyacrylic acid
polymethyl vinyl ether maleic acid
poly α-chloracylic acid
polystyrene-fumaric acid
polyvinyl acetate-crotonic acid
polyvinyl methyl ether-fumaric acid and
polyethylene acrylic acid These acids are reacted with a base such as ammonia, sodium, potassium, or lithium hydroxide or an alkaline earth hydroxide to form a relatively soluble polymeric carboxylic acid salt.

The following table gives the time of stabilization of typical polycarboxylic acid polymers.

| Stabilizer (sodium salt thereof) | Concentration of stabilizer on weight of fiber, percent | Time to convert hemihydrate to dihydrate when immersed in water at 20° C. |
|---|---|---|
| None | 0.00 | 6 minutes. |
| Polyethylene-maleic acid copolymer | 0.08 | 90 minutes. |
| Do | 0.16 | 6 hours. |
| Do | 0.20 | 48 hours. |
| Do | 0.40 | 7 days plus. |
| Polyacrylic acid | 0.16 | 8 hours. |
| Polystyrene-maleic acid | .40 | 45 minutes. |

The method of producing the calcium sulfate whisker fibers can be modified from that described above or completely different processes can be employed. It is possible to use different starting materials and produce the calcium sulfate in the reaction. The above described process of manufacture is however the best mode especially when cost of material, equipment and simplicity of the process are taken into consideration.

Utilities of Calcium Sulfate Whisker Fibers

The calcium sulfate whisker fibers of this invention because of their unique combination of properties can be used in a wide variety of applications. The whisker fibers are non-toxic, have exceptionally high tensile strength and modulus and are relatively low in cost.

The calcium sulfate whisker fibers of this invention can be used as a replacement for asbestos for insulating and fire-proofing of buildings. In this application the relative uniformity of the fiber length is highly advantageous since it results in a more uniform product which does not have the highly dangerous fines that are present in asbestos and is also non-toxic. Even if the calcium sulfate whisker fibers were ingested in reasonable amounts, the body will absorb and eliminate the fibers.

The whisker fibers can be used in place of asbestos in other applications such as for reinforcement of shaped articles. It can be used as reinforcement in cast magnesia cement compositions and the like. It can be used by itself or in combination with other fibers such as defiberized wood. The amount of other fiber used can be 5–15% based on total weight of the fibers employed without substantially adversely affecting the final properties of the magnesium cement composition. The relative low price of the calcium sulfate whisker fibers makes them highly competitive with asbestos, even if the health hazard of asbestos is disregarded.

As is obvious from the above, the calcium sulfate can be used as reinforcements for articles made of plastics. The fibers of this invention are inherently so strong and with such a favorable aspect ratio that the final product, if desired, can be made with thinner cross-sections without reducing the strength. Accordingly, the use of the whisker fibers of this invention can result in a reduction of the cost of the product as well as an increase in the quality of the product. The plastics which can be reinforced using the whisker fibers of this invention include for example, polymers and copolymers of thermosetting and thermoplastic resins. Particular attention is directed to resins such as urea-formaldehyde resins and various phenolic resins and melamine resins. In addition, thermoplastic resins such as polyamides, polyesters, polyurethanes and the like can advantageously be reinforced with the whisker fibers. The presence of calcium ions and sulfate ions in the whisker fibers results in strong chemical bonds being formed between the resins and the whisker fibers which further enhances the properties of the final product.

The incorporation of the whisker fibers of this invention into plastics has produced a substantial improvement in tensile and modulus properties. A key factor in obtaining the ultimate properties of these composites is the formation of a strong bond between the plastic matrix and the whisker fiber. The strength of the bond can be improved by several different methods. Compositions can be applied to the surface of the whisker fibers which improve the wettability of the fibers with the polymeric material. Stearic acid, for example, reacts with the surface of the whisker fibers to produce a fiber which has excellent compatibility with hydrocarbon type polymers. Polyacrylic acid also reacts with the surface to enhance compatibility with acrylic type polymers. Protein hydrolyzates react with or are absorbed by the surface of the fiber to enhance the compatibility with amino type polymers such as urea-formaldehyde, melamine-formaldehyde and urethane polymers. There are of course innumerable chemical combinations to obtain the most receptive surface for enhancing the compatability of whisker fibers with the plastic component.

It is also possible to improve the adhesion by using a coating which contains an unsaturated group which will copolymerize with the polymer component. Linolenic acid, acrylic acid, methacrylic acid, short chain carboxyl terminated unsaturated polyester polymers are examples of compositions which are suitable for producing surface bonded chemically active modified whisker fibers. These fibers when mixed with vinyl type monomers will copolymerize with the matrix polymer component and in effect will produce a graft between the fiber and the polymer. This type of graft is most advantageous in reinforcing polymerizable casting resins for example, polyester, acrylic and styrene resins.

Many extrudable or injection moldable plastics require a plasticizer. The whisker fibers can be mixed with the plasticizer prior to the addition of the plasticizer to the resin. This permits uniform blending of the whisker fibers with the resin using the plasticizer as the dispersing vehicle. Polyvinylchloride polymers are especially suitable for this process.

Polymeric thermoplastic composites with whisker fibers can be treated so as to orient the fiber component to obtain maximum reinforcement of the filament or sheet products. Filament stretching will accomplish orientation of the whisker fibers. Sheet products may be uniaxially or biaxially oriented depending on the properties desired.

The biaxially oriented sheet products will have high strength and modulus and will also have high tear resistance in both directions.

With thermosetting compositions in order to avoid premature setting before molding it has been necessary to keep the monomer mixes cold. Even this does not give indefinite shelf life. If, however, one component of the curing system is applied to the whisker fibers and the other component in the bulk phase, each phase has indefinite shelf life. When the two are mixed, curing is initiated and proceeds uniformly because of the dispersion of fibers. In addition, when curing thermosetting resins a problem often encountered is to disperse the small amount of catalyst uniformly through the large volume of mix. By first applying the catalyst to the whisker fibers, the fibers and the catalyst can be uniformly dispersed throughout the mix which may then readily be polymerized.

It should be noted that while the above discussion concerns the use of the whisker fibers of this invention to reinforce solid plastic articles, that the whisker fibers have also proven to be highly advantageous when used to reinforce plastic foams. The fibers initially support the foams so as to prevent premature collapse during blowing and also impart considerable strength and rigidity to the foamed plastic once it is solidified.

The whisker fibers of this invention can advantageously be blended with conventional fillers such as fiberized wood, for example Bauer's fiber. When the mixture is bonded together the final product will be stronger and more flame resistant due to the presence of the whisker fibers.

The whisker fibers of this invention, especially the anhydrite, are highly resistant to heat degradation. Accordingly, the whisker fibers can be used as reinforcement for many metals. Particular attention is directed to the use of the whisker fibers to reinforce aluminum, iron, titanium and copper articles.

In these applications the surface of the whisker fibers are preferably pretreated so as to improve the adhesion of the metal to the whisker fibers. One highly effective method is to coat the fibers with an organic polymeric material such as carboxy methyl cellulose and then heat the coated fiber to a sufficiently high temperature to carbonize the polymeric material. This then forms a carbon coating on the fibers which improves the adhesion of the metals and fibers. Aluminum and the whisker fibers of this invention have sufficiently close densities that stable blends are readily obtained when the aluminum is in the molten state. The aluminum product which is obtained is stronger and stiffer allowing it to be used more readily in weight bearing structural units. A further advantage of including whisker fibers in metals is that the inclusion of the whisker fibers imparts new flow properties to the molten mixture which can materially enhance the formability of metal. Thinner sheets can be rolled as well as finer wire products. The mechanical working of the metals aligns the whisker fibers, further increasing the strength in the axial direction. The products thus formed have the high strength required for many applications and the products are equivalent to those products with much more expensive conventional whisker fibers.

The use of the whisker fibers is not limited to plastic and metal but can be used to reinforce almost any material, such as tar, asphalt, wax, ceramics, etc. The whisker fibers are compatible with molten glass and hence has the advantage of being dispersible in the melt. Glass fiber formed from these melts have high strength with the whisker fibers oriented in the direction of the fiber axis. This produces a fiber of high strength, modulus and tear resistance. Similar results can be achieved by melt spinning and blowing polymeric materials. It is now possible, using glass fiber spinning techniques, to produce with any melt polymeric system, high strength fibers containing whisker fibers oriented along the fiber axis. This could well produce a new fiber that could be used in tire cord and the like.

The whisker fibers of this invention can be used to make paper in combination with conventional paper making fibers. Wood pulp fibers are especially advantageous combined with the whisker fibers. The whisker fibers act as a filler and improve the opacity, formation, dimensional stability, flammability, and printability. As compared to a conventional non-fibrous filler such as Calapone ($CaSO_4$ anhydrite, finely ground) the bulking properties are outstanding. The high bulk aids in printability because it improves the contact with the printing roll. The excellent bulking properties are useful in many other papers as well. The smooth uniform surface and excellent formation of whisker fiber containing papers are important advantages. The incorporation of whisker fibers in sanitary papers is highly advantageous as the whisker fibers dramatically improve the hand imparting feel.

The physical data of whisker fiber containing paper as compared to Calapone containing paper is shown below:

Properties of paper with various contents of whisker fiber and Calapone

| Basic wt. of paper, lbs. per ream (3,000 sq. ft.) | Percent composition | | | Strength, p.s.i. | Bulk, in. |
| --- | --- | --- | --- | --- | --- |
| | Pulp | V.C. fiber | Calapone | | |
| 50 | 100 | | | 870 | 0.0057 |
| 50 | 90 | 10 | | 862 | 0.0056 |
| 50 | 75 | 25 | | 522 | 0.0061 |
| 50 | 50 | 50 | | 330 | 0.0058 |
| 50 | 75 | | 25 | 725 | 0.0049 |
| 50 | 50 | | 50 | 600 | 0.0038 |

The addition of the whisker fibers up to about 10 percent by weight does not result in any appreciable strength loss, due to poor adhesion of the paper making fibers. If strength loss is undesirable, strength additives can be added to the paper. These additives can be in solution or emulsion form. The technology of this type of treatment is well known to those skilled in the art. Similarly, agents can be used for increasing the dispersibility of V.C. fibers as well as agents to cause the fibers to flocculate for better retention on the paper making wire. Because whisker fibers have a small but appreciable solubility it is desirable to run a closed paper machine system and to presaturate the incoming fresh water by running it through a bed of ground gypsum.

Whisker fibers are especially interesting in disposable papers as they are non-toxic and simply add natural minerals to the ground which under long term conditions are dissolved because of the small but appreciable solubility. If sturdy temporary papers are to be produced the hemihydrate form is preferred since if none or very little of the stabilizer is used the fiber converts to a fine powder and the paper will then distintegrate.

An additional advantage of whisker fibers in sanitary papers is their controlled short length. Papers formed without wet pressing have high bulk and low modulus (very flexible) as seen in the following table.

Properties of non-wet pressed paper

| | Percent fiber composition | | Bulk, in. | Modulus, p.s.i. |
| --- | --- | --- | --- | --- |
| | Pulp | Whisker fiber | | |
| Basic wt., lbs. per ream: | | | | |
| 20 | 100 | | 0.0045 | 30,500 |
| 20 | 50 | 50 | 0.043 | 16,500 |

This type of paper composition and processing forms a flexible high bulk mat which can now be spot bonded by intermittent bonding techniques well known in the art. The long pulp fiber will be bonded by this technique but the short whisker fibers are left only slightly adhered as they were in the original mat. This structure produces the ultimate in bulk, feel, flexibility, formation, opacity and body for a sanitary paper.

For special effects the surface of the whisker fiber can be modified as previously described. Treatment with caustic allows the surface to contain OH groups good for affinity to dyes and reactivity with certain resins. It is also a highly hydrophilic fiber surface. Treatment with stearate produces a debonding fiber surface which is useful in getting a lubricated feel into the paper and to decrease the strength of strong pulps. Treatment of the surface with polyacrylamide polymers and copolymers aid in the fiber dispersibility and improves the bonding of the fibers. Many other surface treatments will be obvious to those skilled in the art.

Since whisker fibers can be readily blended with pulp fibers as well as other fibers in the dry state, it is readily possible to make air-laid mats which have new and useful properties. If the whisker fibers content is high enough they can even be fire retardant. Depending on the surface treatment of the whisker fibers the mat can be highly absorbent or water repellent. The air formed products have great utility in diapers, sanitary napkins, towels, tissue, insulation, packing, felts, etc. The products can remain in the unbonded state or can be bonded by methods now used, e.g. saturation, spraying, print bonding, mercerization for felting, etc.

Since the paper produced from whisker fibers mixed with pulp has excellent formation, it is ideal as a saturating paper. Saturating papers are impregnated with resins (phenolic, urea, melamine, etc.) and are pressed and cured by heated platens. This produces a composite structure which has a resin as the matrix which when under load can transfer stress to the fiber component of the composite. Since whisker fibers have extremely high strength (in excess of 1,000,000 p.s.i.) and high modulus and are flame-proof these boards have highly improved properties as compared to existing products under the trade names of Formica, Micarta, etc. It is now feasible to have structural paper board which can compete with some of the metals for structural and mechanical applications.

The modulus and tensile properties of the whisker fibers make them interesting for all structural boards including corrugated board. The use of saturating resins and other compositions can produce highly improved, low cost corrugated board products. These new products can broaden the application of these papers in honeycomb structural applications as well as in ordinary shipping cartons.

Just as the calcium sulfate whisker fibers are extremely effective to reinforce solid materials, so they can be added to paints, enamels, lacquers, etc. to enhance the strength and durability of the dried film. Since the reinforcement capability is a function of the aspect ratio rather than of the size of fiber, the short fiber ($<100\mu$) can be used for this purpose in paints that can be brushed, sprayed, rolled or otherwise applied like conventional paints.

The cross-linked fiber reinforced gels containing the fibers (such as the alginate-borate ester gelled with whisker fibers) can be formulated to a brushing consistency. When the water evaporates, a rock-hard, washable, substantially inorganic film remains. Thus a low cost paint is produced which itself is not affected by flames or heat, and which can contribute no fuel to a fire.

A highly unexpected and advantageous use of the whisker fibers of this invention is to reinforce the gelled material. Normal aqueous gels are made with substances causing gelling by molecular cross-linking. The calcium sulfate whisker fibers, when added, are believed to react with the gelling agent to produce a cross-linked, fiber reinforced gel. The resulting gels can be made stiff and rubbery. The gelling materials are more stable than conventional gels.

The gel-forming and reinforcing properties of the calcium sulfate whisker fibers are the basis for new strong, water-proof, durable soil stabilizers for improving the bearing strengths of soils for roads, airports, foundations, oil wells, etc. One way to stabilize soil is to mix a rubbery gel formed from whisker fibers, calcium alginate borate ester and water mechanically with the soil which is then compacted. Another way is to prepare a slurry of short fibers in the alginate solution, pour this on the soil, and after this has penetrated into the soil, pour the borate solution over it. (This method of stabilizing soil with 2 solutions has been used to make calcium silicate stabilizers using a lime solution and a sodium silicate solution).

The use of the whisker fibers is almost limitless. For example, when used in cosmetic preparations it can add sufficient body to the preparation so it will remain on the skin for a longer period of time than the conventional oil based preparations which readily rub off.

The following examples are given by way of further illustration of the present invention and are not intended to limit the scope of the claims beyond that of the subjoined claims. All parts and percentages are parts and percentages by weight, not volume, unless otherwise noted.

EXAMPLE 1

A five liter aqueous dispersion was prepared which contains 100 grams of calcium sulfate dihydrate. This dispersion was charged into a pressure reactor equipped with a sight glass and a vertical stirrer. The dispersion was agitated by the stirrer at about 100 r.p.m. The reactor was sealed and heated to 125° C. and maintained at this temperature for 5 minutes. The reaction mixture was observed through the sight glass. The initial mixture was a milky-like dispersion. As the temperature approached 125° C. the dispersion markedly changed in appearance as two separate phases formed. Formation of the fibers was quite noticeable. After about 3 minutes the formation was substantially complete. After five minutes no further formation of fibers was observed. A drain pipe in the bottom of the reactor was opened and the aqueous mixture of fibers was evacuated from the reactor by the pressure within the reactor. The discharged product was filtered to separate the fibers from the water. A sample of the fibers was recovered and later analyzed and found to be comprised of calcium sulfate hemihydrate. The remainder of the recovered product was dried and thereafter treated with 0.40% polyethylene-maleic acid copolymer based weight of the fibers. The product thus obtained was stabilized calcium sulfate hemihydrate whisker fibers of the type shown in FIG. 4. The yield of the desired product was in excess of 90% of the theoretical yield. In subsequent runs when the reactor liquid was recycled to the reactor the yield approached 100%.

EXAMPLE 2

Example 1 was repeated except that after the fibers were removed from the reactor they were heated at 125° C. in an oven until the hemihydrate was converted to the soluble anhydrite. This fiber was thereafter stabilized as above.

EXAMPLE 3

Example 1 was repeated except that the product from the reactor was heated to a temperature of 200° C. and maintained at this temperature until insoluble calcium sulfate hemihydrate fibers were obtained.

EXAMPLE 4

A mixture comprised of 30% by weight of Bauer's fibers and 70% by weight of insoluble calcium sulfate anhydrite whisker fibers were blended with 10% by weight of the mixture of a urea-formaldehyde resin. A mat was formed and then pressed at 400 p.s.i. at a molding temperature of 300° F. for 9 minutes. The board product was self-extinguishing and had a dimensional stability which was 300% better than board made from 100% Bauer fibers.

EXAMPLE 5

A wet blend of Bauer's fibers and whisker fibers including a binder resin was made similar to Example 4 except that a phenol-formaldehyde resin was used as the binder. The board product was molded at 350° F. A satisfactory self-extinguishing high dimensional stability board product was produced.

EXAMPLE 6

A 100% whisker fiber molded board product was produced using techniques similar to Example 4. The product was superior in fire resistance, strength and dimensional stability to both the products of Examples 4 and 5.

EXAMPLE 7

An alginate-borate ester was prepared by taking 5 cc. of 6% alginate solution and adding this to 5 cc. of a saturated sodium borate solution. To the 10 cc. of this mixture 1 gram of whisker fibers prepared as in Example 1 were added. A stiff rubbery gel resulted.

EXAMPLE 8

An alginate-borate ester was prepared as in Example 7 but was evaporated to dryness and finely ground. One gram of the powder was dry blended with 10 grams of a 50–50 mixture of defibrated pulp fibers and calcium sulfate anhydrite whisker fibers. The blended mixture of alginate-borate ester, pulp and whisker fibers exhibited a remarkable capacity to absorb and hold water. Using defibrated pulp as a control for absorbing water, it was observed that the water could be pressed out of the unmodified pulp absorbing medium. The pulp-whisker-alginate-borate absorbing medium, however, retained the water in a fibrous gel and would not release it when moderate mechanical pressure was applied.

Other gel forming systems can be used with the whisker fibers acting as an active fibrous reinforcement. Polyvinyl-alcohol-borate esters would be another example of such a system. This new gelation principle can be useful in food products, absorbent papers, diapers, sanitary napkins, soil stabilization, etc.

EXAMPLE 9

Example 2 was repeated except that the fibers were stabilized after removal from the reactor, before being heated to convert them to the anhydrite. Product obtained was the same as in Example 2.

We claim:
1. A calcium sulfate whisker fiber selected from the group consisting of soluble calcium sulfate anhydrite and insoluble calcium sulfate anhydrite wherein the average diameter to length ratio of said whisker fiber is at least about 1:6.

2. The whisker fiber according to Claim 1 wherein said whisker fiber is insoluble calcium sulfate anhydrite.

3. The method of manufacturing soluble calcium sulfate anhydrite whisker fiber according to Claim 1 wherein an aqueous mixture comprised of up to about 100 grams per liter of calcium sulfate dihydrate is heated to a temperature of about 110° C.–150° C. until calcium sulfate hemihydrate whisker fibers form, recovering the calcium sulfate hemihydrate whisker fiber, drying said calcium sulfate hemihydrate at a temperature below 140° C. until the fibers are converted into soluble calcium sulfate anhydrite.

4. The method of manufacturing the soluble calcium sulfate anhydrite whisker fiber according to Claim 1 wherein an aqueous dispersion comprised of up to about 100 grams per liter of a mixture of at least about 20% by weight of insoluble calcium sulfate anhydrite whisker fibers with the remaining being calcium sulfate dihydrate is heated to a temperature of about 110°–150° C. until soluble calcium sulfate anhydrite fibers are formed and thereafter recovering said fibers.

5. The method of manufacturing the insoluble calcium sulfate anhydrite whisker fiber according to Claim 1 wherein an aqueous mixture containing up to about 100 grams per liter of calcium sulfate dihydrate is heated to a temperature of at least about 110° C. until calcium sulfate hemihydrate whisker fiber form; recovering the calcium sulfate hemihydrate whisker fiber from the aqueous mixture; drying the calcium sulfate hemihydrate whisker fiber at a temperature above the rehydration temperature of the calcium sulfate hemihydrate whisker fiber and below 140° C. until the calcium sulfate hemihydrate whisker fiber is converted into soluble calcium sulfate anhydrite whisker fiber and thereafter heating the soluble calcium sulfate anhydrite whisker fiber at a temperature of at least 140° C. until the soluble calcium sulfate whisker fiber is converted into insoluble calcium sulfate anhydrite whisker fiber.

References Cited

UNITED STATES PATENTS

| 2,151,331 | 3/1939 | Roberts | 423—555 |
| 3,410,655 | 11/1968 | Räter et al. | 423—555 |
| 1,442,406 | 11/1923 | Hennicke | 423—555 |

FOREIGN PATENTS

| 563,019 | 7/1944 | Great Britain | 423—555 |

OTHER REFERENCES

Mellor: A Comprehensive Treatise on Inorganic and Theoretical Chemistry, Vol. 3 (1922), pp. 767–776.

OSCAR R. VERTIZ, Primary Examiner

H. S. MILLER, Assistant Examiner

U.S. Cl. X.R.

106—109